US012627573B2

(12) United States Patent
Moosavi et al.

(10) Patent No.: US 12,627,573 B2
(45) Date of Patent: May 12, 2026

(54) SERVER AND AGENT FOR REPORTING OF COMPUTATIONAL RESULTS DURING AN ITERATIVE LEARNING PROCESS

(71) Applicant: TELEFONAKTIEBOLAGET LM ERICSSON (PUBL), Stockholm (SE)

(72) Inventors: Reza Moosavi, Linköping (SE); Henrik Rydén, Stockholm (SE); Erik G. Larsson, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/710,951

(22) PCT Filed: Nov. 16, 2021

(86) PCT No.: PCT/EP2021/081773
§ 371 (c)(1),
(2) Date: May 16, 2024

(87) PCT Pub. No.: WO2023/088533
PCT Pub. Date: May 25, 2023

(65) Prior Publication Data
US 2025/0016065 A1       Jan. 9, 2025

(51) Int. Cl.
*G06F 15/16*          (2006.01)
*H04L 41/042*        (2022.01)
*H04L 41/16*          (2022.01)

(52) U.S. Cl.
CPC ............ *H04L 41/16* (2013.01); *H04L 41/042* (2013.01)

(58) Field of Classification Search
None
See application file for complete search history.

(56) References Cited

U.S. PATENT DOCUMENTS

2023/0413070 A1*  12/2023  Li  ..................... H04L 25/03343

OTHER PUBLICATIONS

Sery T, Shlezinger N, Cohen K, Eldar YC. Over-the-air federated learning from heterogeneous data. IEEE Transactions on Signal Processing. Jun. 17, 2021;69:3796-811. (Year: 2021).*

(Continued)

*Primary Examiner* — Padma Mundur
(74) *Attorney, Agent, or Firm* — Sage Patent Group

(57)                ABSTRACT

There is provided mechanisms for performing an iterative learning process with agent entities. A method is performed by a server entity. The method includes selecting a linear mapping to be used by the agent entities when reporting computational results of a computational task to the server entity. The linear mapping has an inverse. The linear mapping is selected as a function of an estimated interference level for a radio propagation channel over which the agent entities are to report the computational results of the computational task to the server entity. The method includes configuring the agent entities with the computational task. The method includes performing the iterative learning process with the agent entities until a termination criterion is met. The server entity as part of performing the iterative learning process applies the inverse of the linear mapping to a sum of the computational results.

16 Claims, 13 Drawing Sheets

(56) References Cited

OTHER PUBLICATIONS

International Search Report and Written Opinion mailed Sep. 8, 2022 for International Application No. PCT/EP2021/081773, 15 pages.
Gafni, Tomer et al., "Federated Learning: A Signal Processing Perspective," arXiv.2103.17150v2 [eess.SP], Aug. 23, 2021, 24 pages.
Lan, Qiao et al., "Simultaneous Signal-and-Interference Alignment for Two-Cell Over-the-Air Computation," IEEE Wireless Communications Letters, vol. 9, No. 9, Apr. 20, 2020, 4 pages.
3GPP TR 22.874 V18.1.0 (Sep. 2021); 3rd Generation Partnership Project; Technical Specification Group Services and System Aspects; Study on traffic characteristics and performance requirements for AI/ML model transfer in 5GS (Release 18), 111 pages.

* cited by examiner

SERVER AND AGENT FOR REPORTING OF COMPUTATIONAL RESULTS DURING AN ITERATIVE LEARNING PROCESS

CROSS-REFERENCE TO RELATED APPLICATIONS

This application is a 35 U.S.C. § 371 national stage application for International Application No. PCT/EP2021/081773, entitled "SERVER AND AGENT FOR REPORTING OF COMPUTATIONAL RESULTS DURING AN ITERATIVE LEARNING PROCESS," filed on Nov. 16, 2021, the disclosure and content of which is hereby incorporated by reference in its entirety.

TECHNICAL FIELD

Embodiments presented herein relate to a method, a server entity, a computer program, and a computer program product for performing an iterative learning process with agent entities. Embodiments presented herein further relate to a method, an agent entity, a computer program, and a computer program product for performing an iterative learning process with a server entity.

BACKGROUND

The increasing concerns for data privacy have motivated the consideration of collaborative machine learning systems with decentralized data where pieces of training data are stored and processed locally by edge user devices, such as user equipment. Federated learning (FL) is one non-limiting example of a decentralized learning topology, where multiple (possible very large number of) agents, for example implemented in user equipment, participate in training a shared global learning model by exchanging model updates with a centralized parameter server (PS), for example implemented in a network node.

FL is an iterative process where each global iteration, often referred to as communication round, is divided into three phases: In a first phase the PS broadcasts the current model parameter vector to all participating agents. In a second phase each of the agents performs one or several steps of a stochastic gradient descent (SGD) procedure on its own training data based on the current model parameter vector and obtains a model update. In a third phase the model updates from all agents are sent to the PS, which aggregates the received model updates and updates the parameter vector for the next iteration based on the model updates according to some aggregation rule. The first phase is then entered again but with the updated parameter vector as the current model parameter vector.

A common baseline scheme in FL is named Federated SGD, where in each local iteration, only one step of SGD is performed at each participating agent, and the model updates contain the gradient information. A natural extension is so-called Federated Averaging, where the model updates from the agents contain the updated parameter vector after performing their local iterations.

Analog modulation as used for the transmission of the model updates with over-the-air computation is susceptible to interference. For example, if a particular resource element (RE) on which a model update is transmitted, say the n:th RE, is impacted by interference, this affects all model updates from all the agents to the nth component of the model vector. This is true since all agents transmit their n:th component of the model update in the same RE. This can be mitigated by using FL with dedicated agent-to-PS channels. Communication over dedicated agent-to-PS channels can be achieved by using digital modulation and coding. The impact of interference on particular REs can then be averaged out since no two agents will use the same RE and since modulation and coding as such reduces the impact of interference. Using dedicated agent-to-PS channels the communication latency and overhead. Using dedicated agent-to-PS channels thus comes at a cost of an increased need for network resources and computational resources at both the PS and the agents. There could thus be scenarios where using communication over dedicated agent-to-PS channels for the transmission of the model updates is unfeasible and should be avoided.

SUMMARY

An object of embodiments herein is to address the above issues in order to enable efficient communication between the agents (hereinafter denoted agent entities) and the PS (hereinafter denoted server entity) in scenarios impacted by interference, without resorting using communication over dedicated agent-to-PS channels.

According to a first aspect there is presented a method for performing an iterative learning process with agent entities. The method is performed by a server entity. The method comprises selecting a linear mapping M to be used by the agent entities when reporting computational results of a computational task to the server entity. The linear mapping M has an inverse $M^{-1}$. The linear mapping M is selected as a function of an estimated interference level for a radio propagation channel over which the agent entities are to report the computational results of the computational task to the server entity. The method comprises configuring the agent entities with the computational task. The method comprises performing the iterative learning process with the agent entities until a termination criterion is met. The server entity as part of performing the iterative learning process applies the inverse $M^{-1}$ of the linear mapping M to a sum of the computational results received from the agent entities.

According to a second aspect there is presented a server entity for performing an iterative learning process with agent entities. The server entity comprises processing circuitry. The processing circuitry is configured to cause the server entity to select a linear mapping M to be used by the agent entities when reporting computational results of a computational task to the server entity. The linear mapping M has an inverse $M^{-1}$. The linear mapping M is selected as a function of an estimated interference level for a radio propagation channel over which the agent entities are to report the computational results of the computational task to the server entity. The processing circuitry is configured to cause the server entity to configure the agent entities with the computational task. The processing circuitry is configured to cause the server entity to perform the iterative learning process with the agent entities until a termination criterion is met. The server entity as part of performing the iterative learning process applies the inverse $M^{-1}$ of the linear mapping M to a sum of the computational results received from the agent entities.

According to a third aspect there is presented a server entity for performing an iterative learning process with agent entities. The server entity comprises a select module configured to select a linear mapping M to be used by the agent entities when reporting computational results of a computational task to the server entity. The linear mapping M has an inverse $M^{-1}$. The linear mapping M is selected as a function of an estimated interference level for a radio propagation channel over which the agent entities are to report the computational results of the computational task to the server entity. The server entity comprises a configure module configured to configure the agent entities with the computational task. The server entity comprises a process module configured to perform the iterative learning process with the agent entities until a termination criterion is met. The server entity as part of performing the iterative learning process applies the inverse $M^{-1}$ of the linear mapping M to a sum of the computational results received from the agent entities.

According to a fourth aspect there is presented a computer program for performing an iterative learning process with agent entities, the computer program comprising computer program code which, when run on processing circuitry of a server entity, causes the server entity to perform a method according to the first aspect.

According to a fifth aspect there is presented a method for performing an iterative learning process with a server entity. The method is performed by an agent entity. The method comprises obtaining a linear mapping M to be used by the agent entity when reporting computational results of a computational task to the server entity. The method comprises obtaining configuration in terms of the computational task from the server entity. The method comprises performing the iterative learning process with the server entity until a termination criterion is met. The agent entity as part of performing the iterative learning process applies the linear mapping M to the computational results before sending the computational results to the server entity.

According to a sixth aspect there is presented an agent entity for performing an iterative learning process with a server entity. The agent entity comprises processing circuitry. The processing circuitry is configured to cause the agent entity to obtain a linear mapping M to be used by the agent entity when reporting computational results of a computational task to the server entity. The processing circuitry is configured to cause the agent entity to obtain configuration in terms of the computational task from the server entity. The processing circuitry is configured to cause the agent entity to perform the iterative learning process with the server entity until a termination criterion is met. The agent entity as part of performing the iterative learning process applies the linear mapping M to the computational results before sending the computational results to the server entity.

According to a seventh aspect there is presented an agent entity for performing an iterative learning process with a server entity. The agent entity comprises an obtain module configured to obtain a linear mapping M to be used by the agent entity when reporting computational results of a computational task to the server entity. The agent entity comprises an obtain module configured to obtain configuration in terms of the computational task from the server entity. The agent entity comprises a process module configured to perform the iterative learning process with the server entity until a termination criterion is met. The agent entity as part of performing the iterative learning process applies the linear mapping M to the computational results before sending the computational results to the server entity.

According to an eighth aspect there is presented a computer program for performing an iterative learning process with a server entity, the computer program comprising computer program code which, when run on processing circuitry of an agent entity, causes the agent to perform a method according to the fifth aspect.

According to a ninth aspect there is presented a computer program product comprising a computer program according to at least one of the fourth aspect and the eighth aspect and a computer readable storage medium on which the computer program is stored. The computer readable storage medium could be a non-transitory computer readable storage medium.

Advantageously, these aspects provide efficient communication between the server entity and the agent entities so that the server entity can obtain updates from all agent entities, even in situations of high interference.

Advantageously, these aspects provide robust communication between the server entity and the agent entities in the presence of high interference.

Advantageously, application of these aspects achieve faster convergence of the iterative learning process than in the absence of these aspects.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

The wording that a certain data item, piece of information, etc. is obtained by a first device should be construed as that data item or piece of information being retrieved, fetched, received, or otherwise made available to the first device. For example, the data item or piece of information might either be pushed to the first device from a second device or pulled by the first device from a second device. Further, in order for the first device to obtain the data item or piece of information, the first device might be configured to perform a series of operations, possible including interaction with the second device. Such operations, or interactions, might involve a message exchange comprising any of a request message for the data item or piece of information, a response message comprising the data item or piece of information, and an acknowledge message of the data item or piece of information. The request message might be omitted if the data item or piece of information is neither explicitly nor implicitly requested by the first device.

The wording that a certain data item, piece of information, etc. is provided by a first device to a second device should be construed as that data item or piece of information being sent or otherwise made available to the second device by the first device. For example, the data item or piece of information might either be pushed to the second device from the first device or pulled by the second device from the first device. Further, in order for the first device to provide the data item or piece of information to the second device, the first device and the second device might be configured to perform a series of operations in order to interact with each other. Such operations, or interaction, might involve a message exchange comprising any of a request message for the data item or piece of information, a response message comprising the data item or piece of information, and an acknowledge message of the data item or piece of information. The request message might be omitted if the data item or piece of information is neither explicitly nor implicitly requested by the second device.

Figure 1:
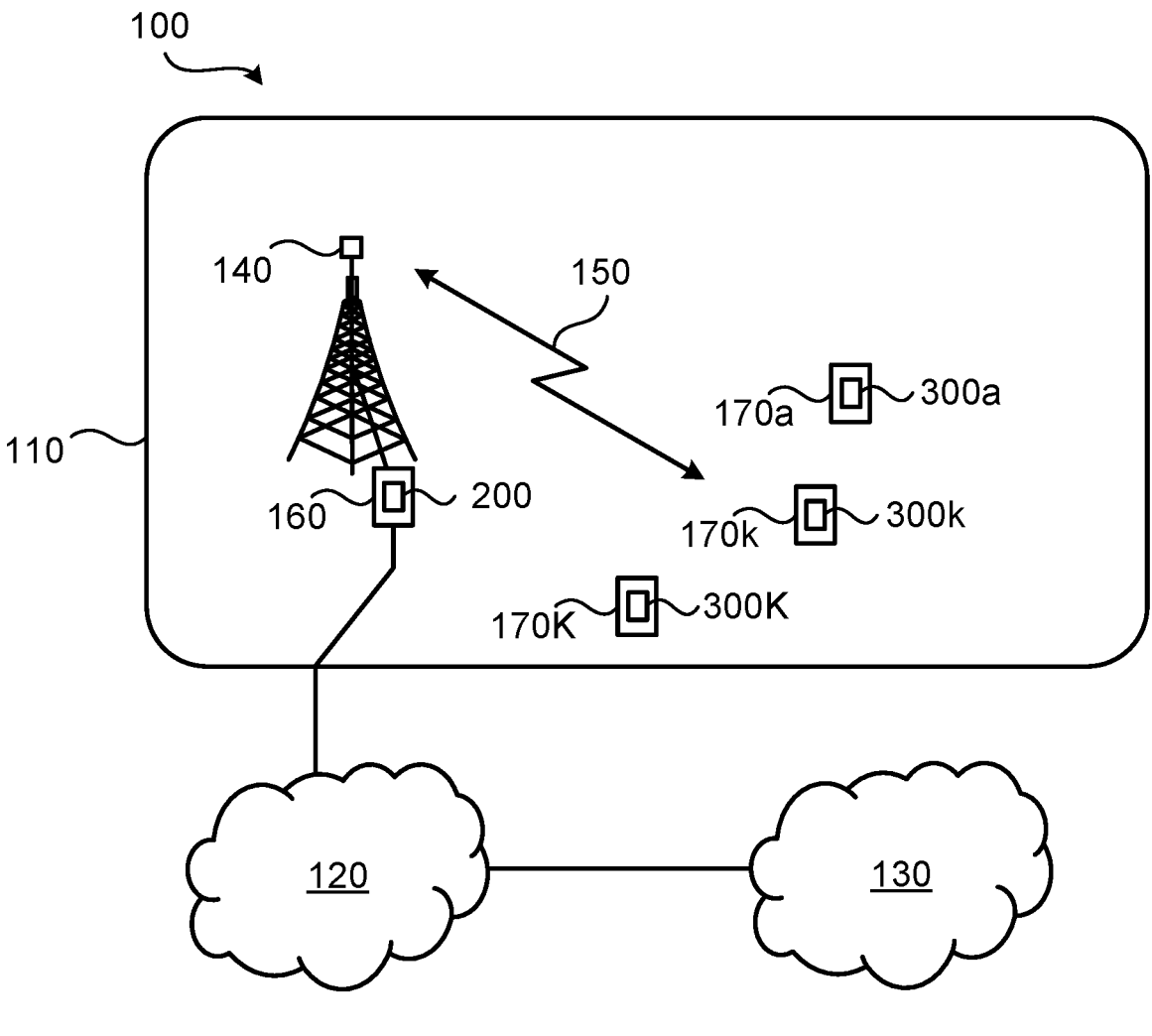
FIG. 1 is a schematic diagram illustrating a communication network according to embodiments.

FIG. 1 is a schematic diagram illustrating a communication network 100 where embodiments presented herein can be applied. The communication network 100 could be a third generation (3G) telecommunications network, a fourth generation (4G) telecommunications network, a fifth (5G) telecommunications network, a sixth (6G) telecommunications network, and support any 3GPP telecommunications standard.

The communication network 100 comprises a transmission and reception point 140 configured to provide network access to user equipment 170a, 170k, 170K in an (radio) access network 110 over a radio propagation channel 150. The access network 110 is operatively connected to a core network 120. The core network 120 is in turn operatively connected to a service network 130, such as the Internet. The user equipment 170a:170K is thereby, via the transmission and reception point 140, enabled to access services of, and exchange data with, the service network 130.

Operation of the transmission and reception point 140 is controlled by a network node 160. The network node 160 might be part of, collocated with, or integrated with the transmission and reception point 140.

Examples of network nodes 160 are (radio) access network nodes, radio base stations, base transceiver stations, Node Bs (NBs), evolved Node Bs (eNBs), gNBs, access points, access nodes, and integrated access and backhaul nodes. Examples of user equipment 170a:170K are wireless devices, mobile stations, mobile phones, handsets, wireless local loop phones, smartphones, laptop computers, tablet computers, network equipped sensors, network equipped vehicles, and so-called Internet of Things devices.

It is assumed that the user equipment 170a:170K are to be utilized during an iterative learning process and that the user equipment 170a:170K as part of performing the iterative learning process are to report computational results to the network node 160. The network node 160 therefore comprises, is collocated with, or integrated with, a server entity 200. Each of the user equipment 170a:170K comprises, is collocated with, or integrated with, a respective agent entity 300a:300K.

Figure 2:
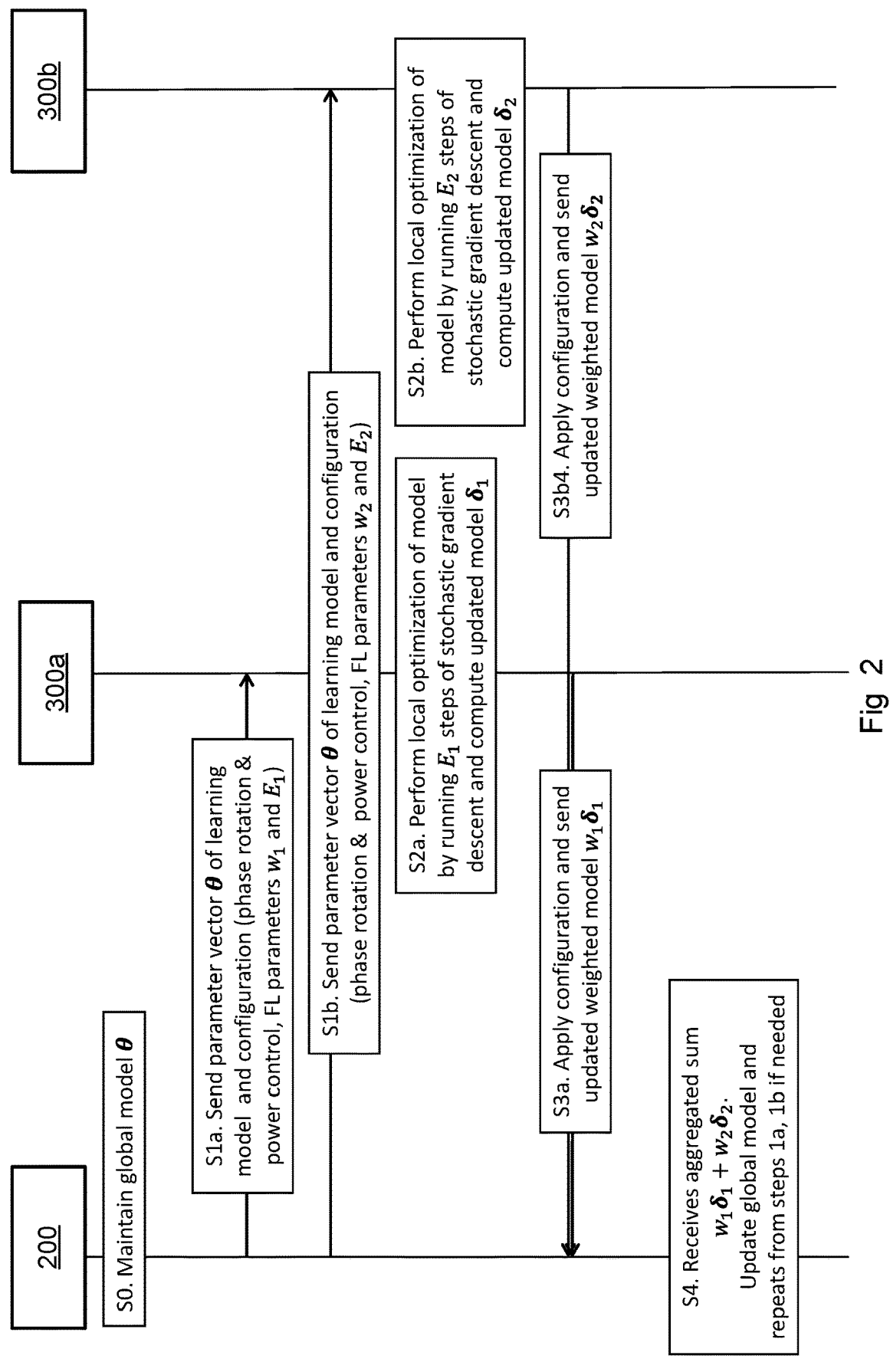
FIG. 2 is a signalling diagram according to an example.

Reference is next made to the signalling diagram of FIG. 2, illustrating an examples of a nominal iterative learning process. Consider a setup with K agent entities 300a:300K, and one server entity 200. Each transmission from the agent entities 300a:300K is allocated N resource elements (REs). These can be time/frequency samples, or spatial modes. For simplicity, but without loss of generality, the example in FIG. 2 is shown for two agent entities 300a, 300b, but the principles hold also for larger number of agent entities 300a:300K.

The server entity 200 updates its estimate of the learning model (maintained as a global model $\theta$ in step S0), as defined by a parameter vector $\theta(i)$, by performing global iterations with an iteration time index i. The parameter vector $\theta(i)$ is assumed to be an N-dimensional vector. At each iteration i, the following steps are performed:

Steps S1a, S1b: The server entity 200 broadcasts the current parameter vector of the learning model, $\theta(i)$, to the agent entities 300a, 300b.

Steps S2a, S2b: Each agent entity 300a, 300b performs a local optimization of the model by running T steps of a stochastic gradient descent update on $\theta(i)$, based on its local training data;

$$\theta_k(i, \tau) = \theta_k(i, \tau - 1) - \eta_k \nabla f_k(\theta_k(i, \tau - 1))\ \tau = 1, \ldots, T,$$

where $\eta_k$ is a weight and $f_k$ is the objective function used at agent entity k (and which is based on its locally available training data).

Steps S3a, S3b: Each agent entity 300a, 300b transmits to the server entity 200 their model update § $\delta_k(i)$;

$$\delta_k(i) = \theta_k(i, T) - \theta_k(i, 0),$$

where $\theta_k(i,0)$ is the model that agent entity k received from the server entity 200. Steps S3a, S3b may be performed sequentially, in any order, or simultaneously.

Step S4: The server entity 200 updates its estimate of the parameter vector $\theta(i)$ by adding to it a linear combination (weighted sum) of the updates received from the agent entities 300a, 300b;

$$\theta(i+1) = \theta(i) + w_1\delta_1(i) + w_2\delta_2(i)$$

where $w_k$ are weights.

Assume now that there are K agent entities and hence K model updates. When the model updates $\{\delta_1, \ldots, \delta_K\}$ (where the time index has been dropped for simplicity) from the agent entities 300a:300K over a wireless communication channel, there are specific benefits of using direct analog modulation. For analog modulation, the k:th agent entity could transmit the N components of $\delta_k$ directly over N resource elements (REs). Here an RE could be, for example: (i) one sample in time in a single-carrier system, or (ii) one subcarrier in one orthogonal frequency-division multiplexing (OFDM) symbol in a multicarrier system, or (iii) a particular spatial beam or a combination of a beam and a time/frequency resource.

One benefit of direct analog modulation is that the superposition nature of the wireless communication channel can be exploited to compute the aggregated update, $\delta_1+\delta_2 \ldots +\delta_K$. More specifically, rather than sending $\delta_1, \ldots, \delta_K$ to the server entity 200 on separate channels, the agent entities 300a:300K could send the model updates $\{\delta_1, \ldots, \delta_K\}$ simultaneously, using N REs, through linear analog modulation. The server entity 200 could then exploit the wave superposition property of the wireless communication channel, namely that $\{\delta_1, \ldots, \delta_K\}$ add up "in the air". Neglecting noise and interference, the server entity 200 would thus receive the linear sum, $\delta_1+\delta_2+ \ldots +\delta_K$, as desired. That is, the server entity 200 ultimately is interested only in the aggregated model update $\delta_1+\delta_2+ \ldots +\delta_K$, but not in each individual parameter vector $\{\delta_1, \ldots, \delta_K\}$. This technique can thus be referred to as iterative learning with over-the-air computation.

The over-the-air computation assumes that appropriate power control is applied (such that all transmissions of $\{\delta_k\}$ are received at the server entity 200 with the same power), and that each transmitted $\delta_k$ is appropriately phase-rotated prior to transmission to pre-compensate for the phase rotation incurred by the channel from agent entity k to the server entity 200.

One benefit of the thus described over-the-air computation is the savings of radio resources. With two agents (K=2), 50% resources are saved compared to standard FL since the two agent entities can send their model updates simultaneously in the same RE. With K agent entities, only a fraction 1/K of the nominally required resources are needed.

As disclosed above, analog modulation as used for the transmission of the model updates with over-the-air computation is susceptible to interference. As further disclosed above, there could be scenarios where using communication over dedicated agent-to-PS channels for the transmission of the model updates is unfeasible and should be avoided.

Further in this respect, in some situations, the UE can experience predictable performance in case an interferer (e.g., a network node not serving the user equipment 170a: 170K in which the agent entities 300a:300K are provided, or another radio source that communicates within the same bandwidth as the user equipment 170a:170K in which the agent entities 300a:300K are provided) uses a certain traffic pattern, such as periodic data transmissions. This could also be the case when an interferer using a certain time-division duplex (TDD) pattern that is different from the TDD pattern of the network node 160. This could result in that uplink transmission from the user equipment 170a:170K might coincide with downlink transmission from another network node, thus resulting in this another network node causing interference.

The embodiments disclosed herein therefore relate to mechanisms for performing an iterative learning process with agent entities 300a:300K and performing an iterative learning process with a server entity 200. In order to obtain such mechanisms there is provided a server entity 200, a method performed by the server entity 200, a computer program product comprising code, for example in the form of a computer program, that when run on processing circuitry of the server entity 200, causes the server entity 200 to perform the method. In order to obtain such mechanisms there is further provided an agent entity 300k, a method performed by the agent entity 300k, and a computer program product comprising code, for example in the form of a computer program, that when run on processing circuitry of the agent entity 300k, causes the agent entity 300k to perform the method.

Figure 3:
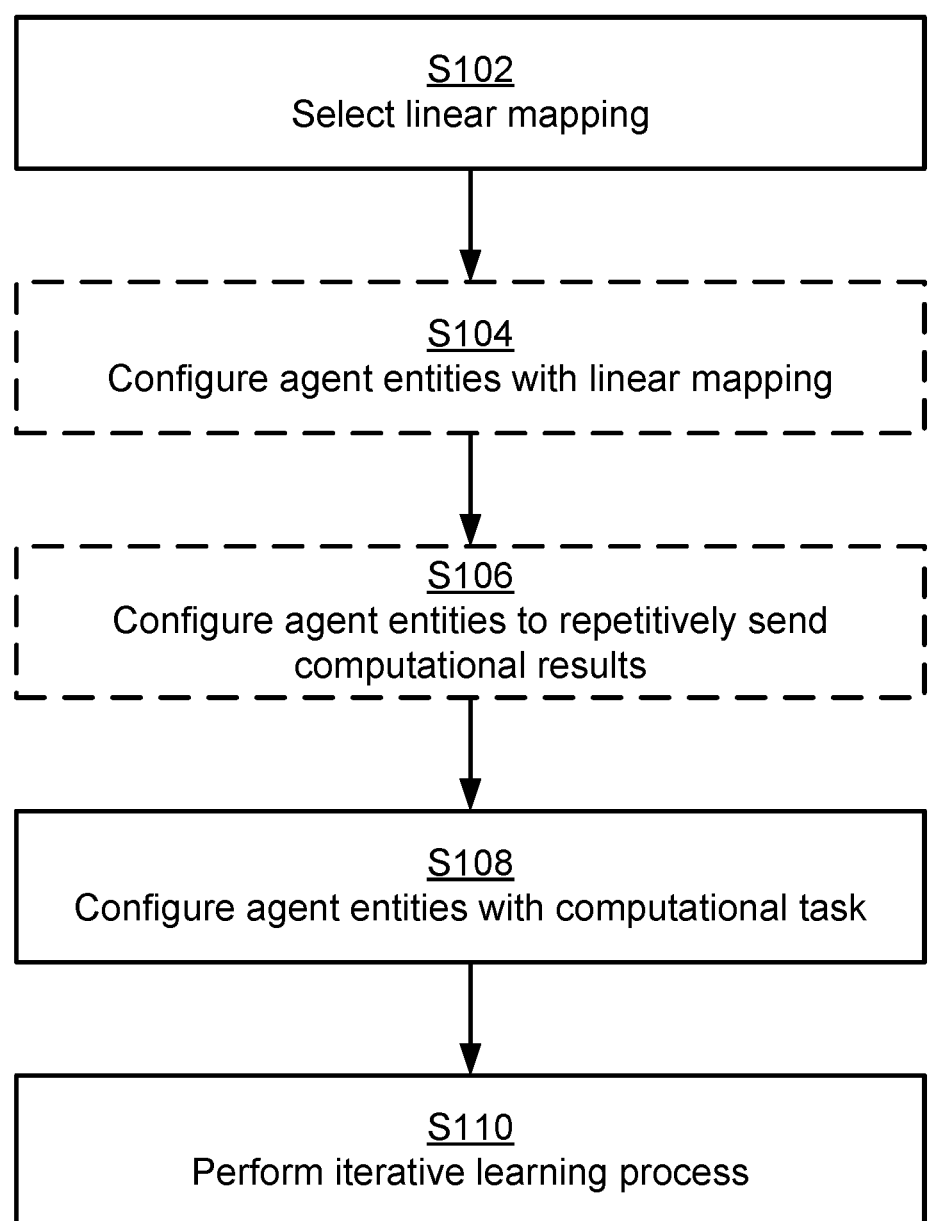
FIGS. 3, 4, 5, and 6 are flowcharts of methods according to embodiments.

Reference is now made to FIG. 3 illustrating a method for performing an iterative learning process with agent entities 300a:300K as performed by the server entity 200 according to embodiments.

S102: The server entity 200 selects a linear mapping M to be used by the agent entities 300a:300K when reporting computational results of a computational task to the server entity 200. The linear mapping M has an inverse $M^{-1}$. The linear mapping M is selected as a function of an estimated interference level for a radio propagation channel over which the agent entities 300a:300K are to report the computational results of the computational task to the server entity 200.

S108: The server entity 200 configures the agent entities 300a:300K with the computational task.

S110: The server entity 200 performs the iterative learning process with the agent entities 300a:300K until a termination criterion is met. The server entity 200 as part of performing the iterative learning process applies the inverse $M^{-1}$ of the linear mapping M to a sum of the computational results received from the agent entities 300a:300K.

Embodiments relating to further details of performing an iterative learning process with agent entities 300a:300K as performed by the server entity 200 will now be disclosed.

The termination criterion in some non-limiting examples can be when a pre-determined number of iterations have been reached or when the computational results differ less than a threshold value from one iteration to the next.

As disclosed above, the server entity 200 selects a linear mapping M to be used by the agent entities 300a:300K when reporting computational results of a computational task to the server entity 200. Aspects of how the server entity 200 might selects the linear mapping M will be disclosed next.

In some aspects, the linear mapping is represented by an invertible matrix. In particular, in some embodiments, the linear mapping M is represented by a matrix $M_k$ having an inverse $M_k^{-1}$, and the computational results received from the agent entities 300a:300K are multiplied with the inverse $M_k^{-1}$ of the matrix $M_k$ when the inverse inverse $M^{-1}$ of the linear mapping M is applied to the computational results. There could be different examples of invertible matrices. In some examples the matrix $M_k$ is a permutation matrix, a weighting matrix or an orthonormal matrix.

In some aspects, the server entity 200 explicitly indicates to the agent entities which particular REs should (or should not) be used for transmission of the computational results. Hence, in some embodiments, the computational results per iteration are to be sent in frames composed of REs, and the linear mapping M defines in which of the REs in the frame the agent entities 300*a*:300K are to send the computational results and as well as in which of the resource elements in the frame the agent entities 300*a*:300K are not to send the computational results. This could be the case where there are more available REs than computational results. That is, when the number of available REs per frame is larger than N.

In some aspects the agent entities 300*a*:300K are preconfigured with the linear mapping M and the server entity 200 does therefore not need to provide, or otherwise configure, the agent entities 300*a*:300K with the linear mapping M. However, in other aspects the agent entities 300*a*:300K are not preconfigured with the linear mapping M. Therefore, in some embodiments, the server entity 200 is configured to perform (optional) step S104:

S104: The server entity 200 configures the agent entities 300*a*:300K with the linear mapping M over a channel established between the server entity 200 and the agent entities 300*a*:300K.

In some aspects, the interference is so severe that the agent entities 300*a*:300K need to send the same computational results at least two times (i.e., using at least two repetitions) to the server entity 200. This can be regulated by packet retransmission techniques, such as a hybrid automatic repeat request (hybrid ARQ or HARQ) mechanism, implemented in the server entity 200 and the agent entities 300*a*:300K. Different linear mappings might then be applied to each of the at least two transmissions of the computational results. In particular, in some embodiments, the server entity 200 is configured to perform (optional) step S106:

S106: The server entity 200 configures the agent entities 300*a*:300K to repetitively send the computational results in at least two repetitions, where mutually different linear mapping M are to be applied to the computational results for each of the at least two repetitions.

The server entity 200 might thereby request the agent entities 300*a*:300K to send their updates repetitively applying different transformation matrices. In this way, diversity can be achieved as the same information is transmitted repeatedly in different time/frequency resources.

The agent entities 300*a*:300K might all use one and the same linear mapping M. That is, in some embodiments, the linear mapping M is the same for all the agent entities 300*a*:300K.

As disclosed above, the linear mapping M is selected as a function of an estimated interference level for a radio propagation channel over which the agent entities 300*a*:300K are to report the computational results of the computational task to the server entity 200. Further aspects of how the server entity 200 might obtain information of the estimated interference level will be disclosed next.

In some embodiments, the interference level is estimated per each resource element in the frame. In some embodiments, the linear mapping M is then a function of the estimated interference level per resource element. The resource elements might be time/frequency samples or define a spatial mode.

In some examples, the server entity 200 monitors the interference level according to a pre-determined schedule.

In some embodiments, the interference level is estimated during a period free from scheduled transmissions from the agent entities 300*a*:300K. For example, the server entity 200 might every T seconds ensure that there are no active transmissions in the cell and then estimate the received energy on each RE. This received energy per RE quantifies the level of interference from outside of the cell, or outside of the system (in case of unlicensed operation, for example), on that RE.

In some examples, an external event might trigger the measurement of interference level, for example the server entity 200 obtaining an indication of changed TDD pattern by a neighboring node.

In some examples, the server entity 200 receives traffic information from neighboring network nodes. This traffic information can be related to how much interference the neighboring network node might cause to the server entity 200. The neighboring network node might share any of: load information, exchange predicted values of resource utilization, signal its scheduling decisions, upcoming scheduling decisions, for example in what time/frequency/code resources there will be traffic, possible in combination with information related to the radiolocation (in terms of beams in which its user equipment are served) or geolocation of its served user equipment, power control configurations for its served user equipment, etc. to the server entity 200. The server entity 200 can be then use the received information as input when estimating the interference level at the server entity 200. For example, the server entity 200 might correlate the traffic expected from any neighboring network node(s), with its own estimates of the interference in empty time-frequency resources. The server entity 200 might then use this information to estimate the interference from the neighboring network nodes in the resources used for the iterative learning process. Further, the neighboring network nodes might identified be based on handover statistics. The resource utilization prediction for a given neighboring network node might be derived for specific coverage areas, for example user equipment served by a specific beam by the given neighboring network node. Further aspects relating to this will be disclosed with reference to FIG. 7.

In some embodiments, the interference level is estimated based on the computational results received from the agent entities 300*a*:300K. For example, the interference level might be estimated using information of the model parameters. In case the change of a certain component (such as a specific neuron or layer) is large, it can be expected that its parameter is affected by interference. Also, in case the model performance is converging, it can be expected that the difference in components is smaller, and hence the threshold for estimating a large parameter change that is due to interference should be less. Further, regularization can be applied when training the neural network model. Specifically, a regularizer can be used in order to add an extra cost for large parameters (e.g., high weights). An overall loss function can be defined as:

$$\text{Loss} = \text{scenario-specific-loss} + t \cdot (|\delta_1| + |\delta_2| + \ldots + |\delta_K|),$$

where t handles the trade-off between use-case specific loss versus model weights. The server entity 200 might then monitor the loss in terms of the summed model parameter values, and estimate the interference based on this loss. The server entity 200 might, for example, define a high loss if any layer, or neuron, has a value being above a certain threshold value. Then, when the layer, or neuron, has a value that is above the threshold value after the over-the-air computation, this might indicate that the value has been interfered. Other regularization terms than the sum of the parameter values can also be used for this purpose.

Figure 4:
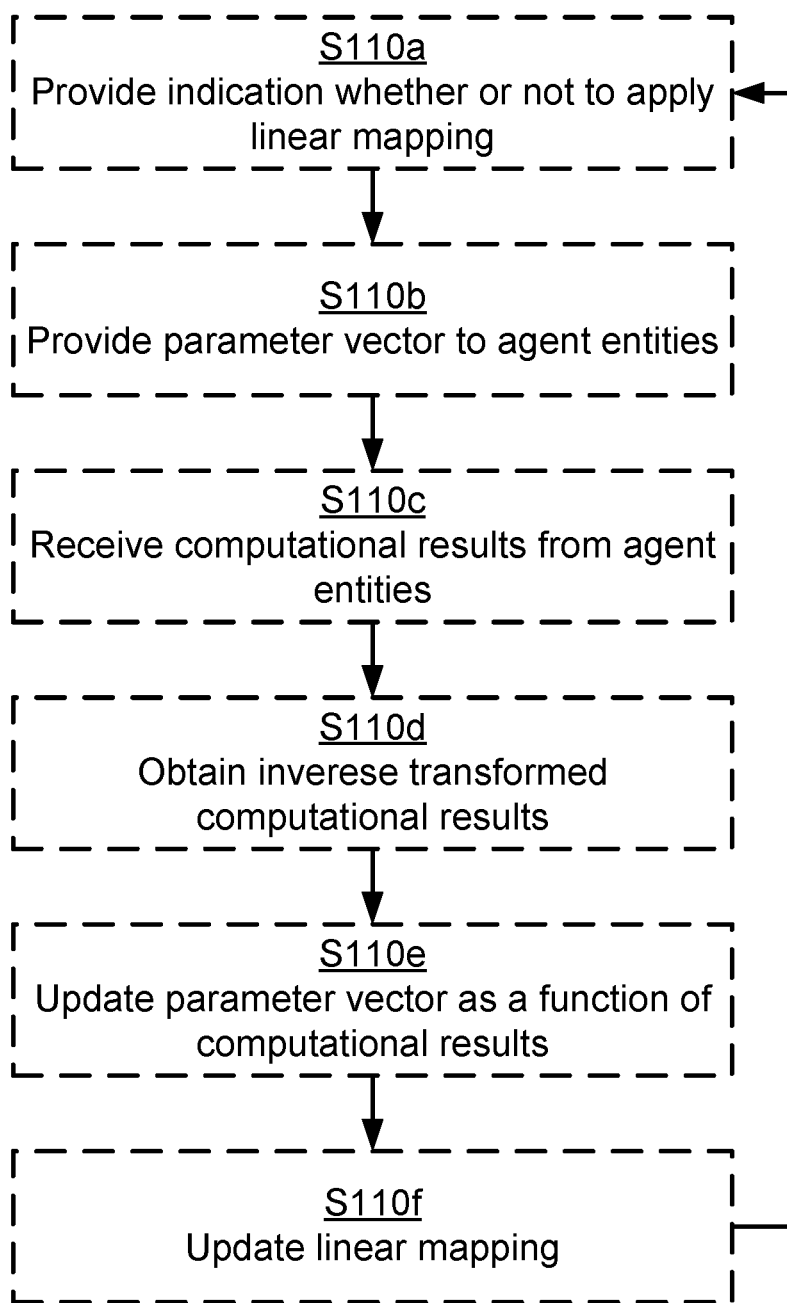

Intermediate reference is next made to the flowchart of FIG. 4 showing optional steps of one iteration of the iterative learning process that might be performed by the server entity 200 during each iteration of the iterative learning process in S110.

S110*b*: The server entity 200 provides a parameter vector of the computational task to the agent entities 300*a*:300K.

S110*c*: The server entity 200 receives the computational results as a function of the parameter vector from the agent entities 300*a*:300K.

S110*d*: The server entity 200 obtains inverse transformed computational results by applying the inverse $M^{-1}$ to the sum of the computational results.

S110*e*: The server entity 200 updates the parameter vector as a function of an aggregate of the inverse transformed computational results.

In some aspects, the server entity 200 not only estimates the current level of interference but also predicts a future interference level. That is, the server entity 200 might be configured to predict how the interference level evolves over time. This can impact how the linear mapping M is selected. In some aspects the server entity 200 thus updates the linear mapping M from one iteration to the next of the iterative learning process in S110. Hence, in some embodiments, the server entity 200 is configured to perform (optional) step S110*f* as part of performing the iterative learning process in S110:

S110*f*: The server entity 200 updates the linear mapping M for a next iteration of the iterative learning process. The linear mapping M as updated has a new inverse.

There could be different factors that impact how the linear mapping M is updated. In this respect, examples of how the interference level might be estimated have been provided above. The linear mapping M might be updated according to an updated estimation of the interference level. Hence, in some embodiments, the linear mapping M is updated according to an updated estimation of the interference level. In this way, the server entity 200 might estimate which elements of the model update that were subject to large interference in the previous iteration of the iterative learning process and then update the linear mapping M to mitigate further impact of interference on these elements. For example, the server entity 200 might determine which elements of the model update that were subject to large interference in the current global iteration round. This can be determined as follows. Let j be a RE index ($j \in \{1, \ldots, N\}$) that experienced high interference. Let q be an index such that the (j,q):th element of the matrix M used in the previous round was large (or at least non-zero). Then it can be concluded that the q:th element of the model update was subject to high interference in the current global iteration round. The server entity 200 should then select a new M for the next global iteration round in such a way that its (j,q):th element is zero (or very small).

The linear mapping M might alternatively be updated according to a predetermined sequence. Hence, in some embodiments, the linear mapping M is updated according to a predetermined sequence. For example, in the t:th global iteration round the t:th element of a pre-determined sequence $\{i_1, i_2, i_3, \ldots\}$ is selected, and this t:th element defines which linear mapping to be used for the t:th global iteration round. For example, assuming that the linear mappings are provided in terms of permutation matrices, for the third global iteration round, the permutation matrix with index $i_3$ is selected.

The updating of the linear mapping M might either be triggered periodically, or be event-triggered. Hence, in some embodiments, the linear mapping M is either periodically updated or updated upon an updating event having been triggered in the server entity 200.

In some aspects, the server entity 200 selectively determines whether or not the agent entities 300*a*:300K are to apply the linear mapping M when reporting the computational results. Hence, in some embodiments, the server entity 200 is configured to perform (optional) step S110*a* as part of performing the iterative learning process in S110:

S110*a*: The server entity 200 provides an indication to the agent entities 300*a*:300K as to whether or not to apply the linear mapping M when reporting the computational results of the computational task to the server entity 200.

Aspects of how the server entity 200 might determine whether or not the agent entities 300*a*:300K are to apply the linear mapping M when reporting the computational results will be disclosed next.

In some examples, the server entity 200 performs training on a dataset to verify whether the current global model meets predicted requirements. In some examples, the server entity 200 checks the model improvements after each global iteration round, for example to detect an increase or decrease in the training, or testing error. The performance can also be based on reported performance feedback, for example, the prediction accuracies for the local dataset for each of the agent entities 300*a*:300K. Hence, in some embodiments, whether or not to the agent entities 300*a*:300K are apply the linear mapping M is based on performance feedback obtained from the agent entities 300*a*:300K. The agent entities 300*a*:300K might, for example, indicate that the model as received from the server entity 200 is not improving the prediction performance on the local dataset. The server entity 200 might configure the agent entities 300*a*:300K to report this in case the improvements are not within a certain threshold range over a number of training rounds. The server entity 200 then determine that the agent entities 300*a*:300K are to apply the linear mapping M when reporting the computational results. In yet further aspects the server entity 200 obtains traffic information from other network nodes, as will be further disclosed below with reference to FIG. 7.

Figure 5:
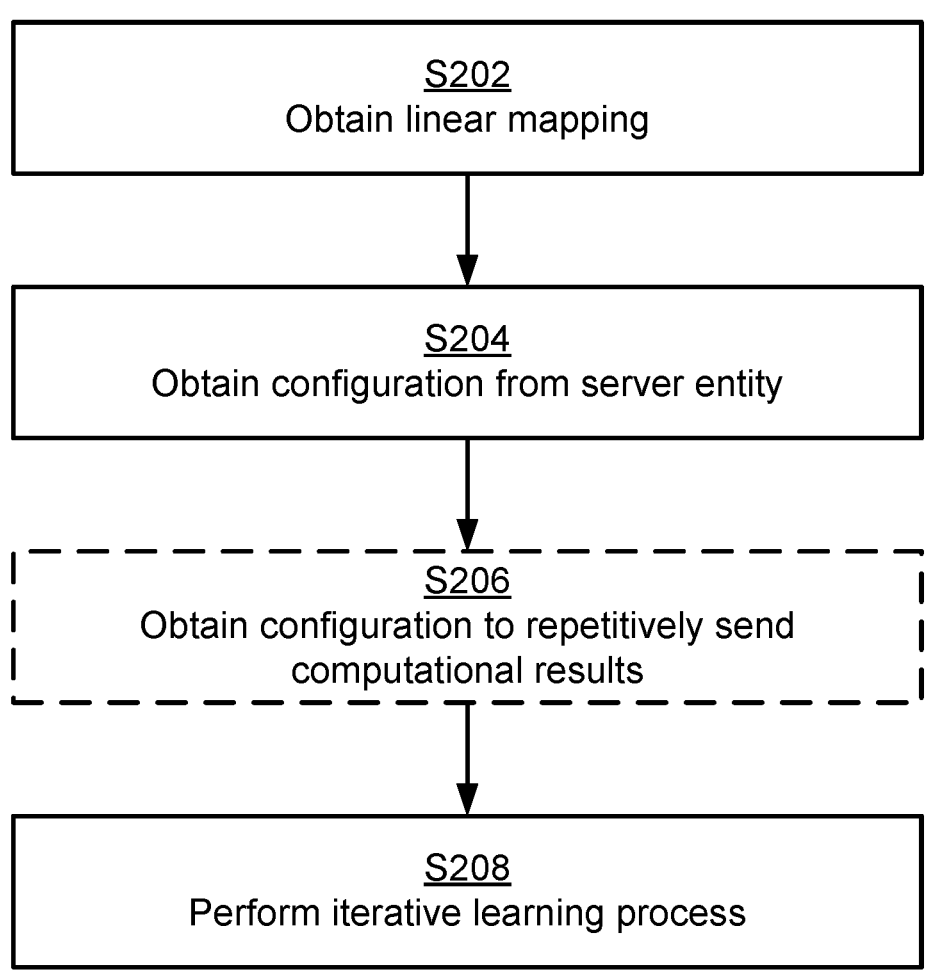

Reference is now made to FIG. 5 illustrating a method for performing an iterative learning process with a server entity 200 as performed by the agent entity 300*k* according to embodiments.

S202: The agent entity 300*k* obtains a linear mapping M to be used by the agent entity 300*k* when reporting computational results of a computational task to the server entity 200.

S204: The agent entity 300*k* obtains configuration in terms of the computational task from the server entity 200.

S208: The agent entity 300*k* performs the iterative learning process with the server entity 200 until a termination criterion is met. The agent entity 300*k* as part of performing the iterative learning process applies the linear mapping M to the computational results before sending the computational results to the server entity 200.

Embodiments relating to further details of performing an iterative learning process with a server entity 200 as performed by the agent entity 300*k* will now be disclosed.

The termination criterion in some non-limiting examples can be when a pre-determined number of iterations have been reached or when the computational results differ less than a threshold value from one iteration to the next.

As disclosed above, in some embodiments, the computational results per iteration are to be sent in frames composed of resource elements, and the linear mapping M defines in which of the resource elements in the frame the agent entity 300*k* is to send the computational results and as well as in which of the resource elements in the frame the agent entity 300*k* is not to send the computational results.

As disclosed above, in some embodiments, the linear mapping M is obtained from the server entity 200 over a channel established between the agent entity 300*k* and the server entity 200.

As disclosed above, in some embodiments, the linear mapping M is represented by a matrix M k, and the computational results are multiplied with the matrix M k when the linear mapping M is applied to the computational results.

As disclosed above, in some embodiments, the matrix M k is a permutation matrix or an orthonormal matrix.

As disclosed above, in some aspects, the interference is so severe that the agent entities 300*a*:300K need to send the same computational results at least two times. Hence, in some embodiments, the agent entity 300*k* is configured to perform (optional) step S206:

S206: The agent entity 300*k* obtains configuration for the agent entity 300*k* to repetitively send the computational results in at least two repetitions. Mutually different linear mapping M are to be applied by the agent entity 300*k* to the computational results for each of the at least two repetitions.

As disclosed above, in some embodiments, the linear mapping M is updated according to a predetermined sequence. The agent entity 300*k* might be preconfigured with the predetermined sequence and hence there might not be any need for the server entity 200 to explicitly provide the predetermined sequence to the agent entity 300*k*.

Figure 6:
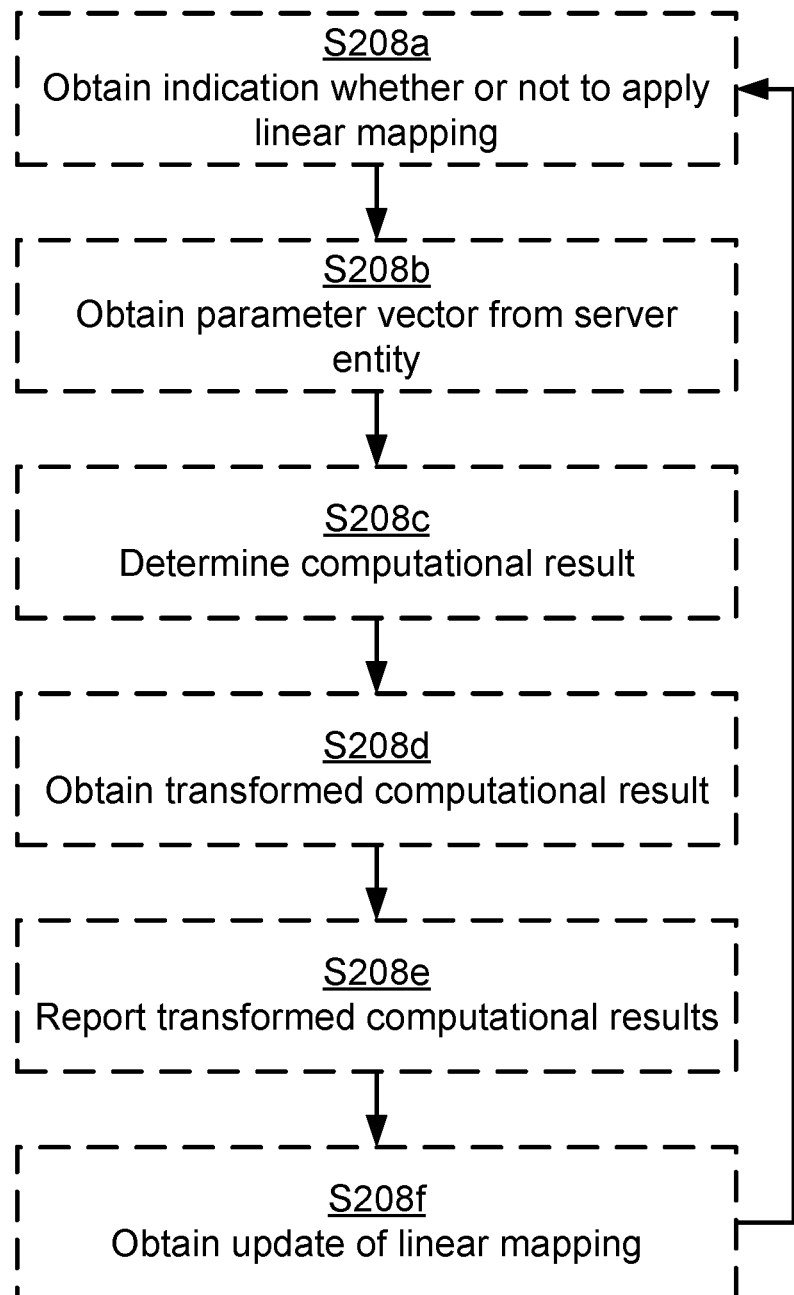

Intermediate reference is next made to the flowchart of FIG. 6 showing optional steps of one iteration of the iterative learning process that might be performed by the agent entity 300*k* during each iteration of the iterative learning process in S208.

S208*b*: The agent entity 300*k* obtains S208*b* a parameter vector of the computational problem from the server entity 200.

S208*c*: The agent entity 300*k* determines S208*c* the computational result of the computational task as a function of the obtained parameter vector for the iteration and of data locally obtained by the agent entity 300*k*.

S208*d*: The agent entity 300*k* obtaining S208*d* a transformed computational result by applying the linear mapping M to the computational result.

S208*e*: The agent entity 300*k* reports S208*e* the transformed computational result to the server entity 200.

As disclosed above, in some aspects the server entity 200 updates the linear mapping M from one iteration to the next of the iterative learning process. Hence, in some embodiments, the agent entity 300*k* is configured to perform (optional) step S208*f* as part of performing the iterative learning process in S208:

S208*f*: The agent entity 300*k* obtains an update of the linear mapping M for a next iteration of the iterative learning process.

As disclosed above, in some aspects, the server entity 200 selectively determines whether or not the agent entities 300*a*:300K are to apply the linear mapping M when reporting the computational results. Hence, in some embodiments, the agent entity 300*k* is configured to perform (optional) step S208*a* as part of performing the iterative learning process in S208:

S208*a*: The agent entity 300*k* obtains an indication from the server entity 200 as to whether or not to apply the linear mapping M when reporting the computational results of the computational task to the server entity 200.

Figure 7:
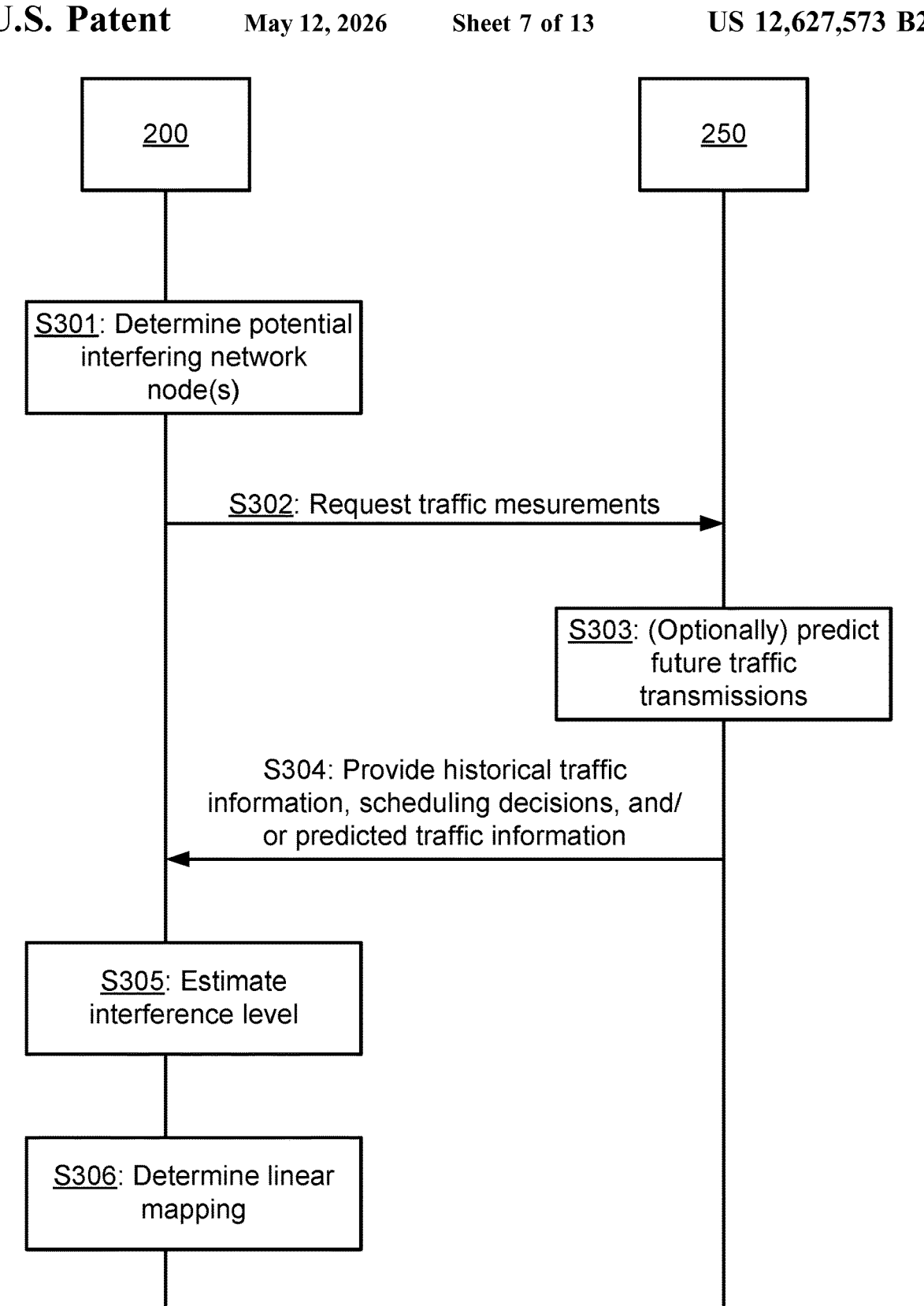
FIGS. 7 and 8 are signalling diagrams according to embodiments.

One particular embodiment of how to predict interference as performed by the server entity 200 will now be disclosed in detail with reference to the signalling diagram of FIG. 7.

S301: The server entity 200 determines potential interfering network node(s) 250, for example based on mobility measurements.

S302: The server entity 200 requests traffic measurements from the potential interfering network node(s) 250.

S303: The potential interfering network node(s) 250 (optionally) predict their future traffic transmissions.

S304: The potential interfering network node(s) 250 respond to the server entity 200 by providing historical traffic information, scheduling decisions, and/or predicted traffic information.

S305: The server entity 200 estimates the interference level based on the received historical traffic information, scheduling decisions, and/or predicted traffic information as well as based on historical interference information.

S306: The server entity 200 determines the linear mapping based on the estimated the interference level and configures the agent entities 300*a*:300K with information of the linear mapping, as needed.

Figure 8:
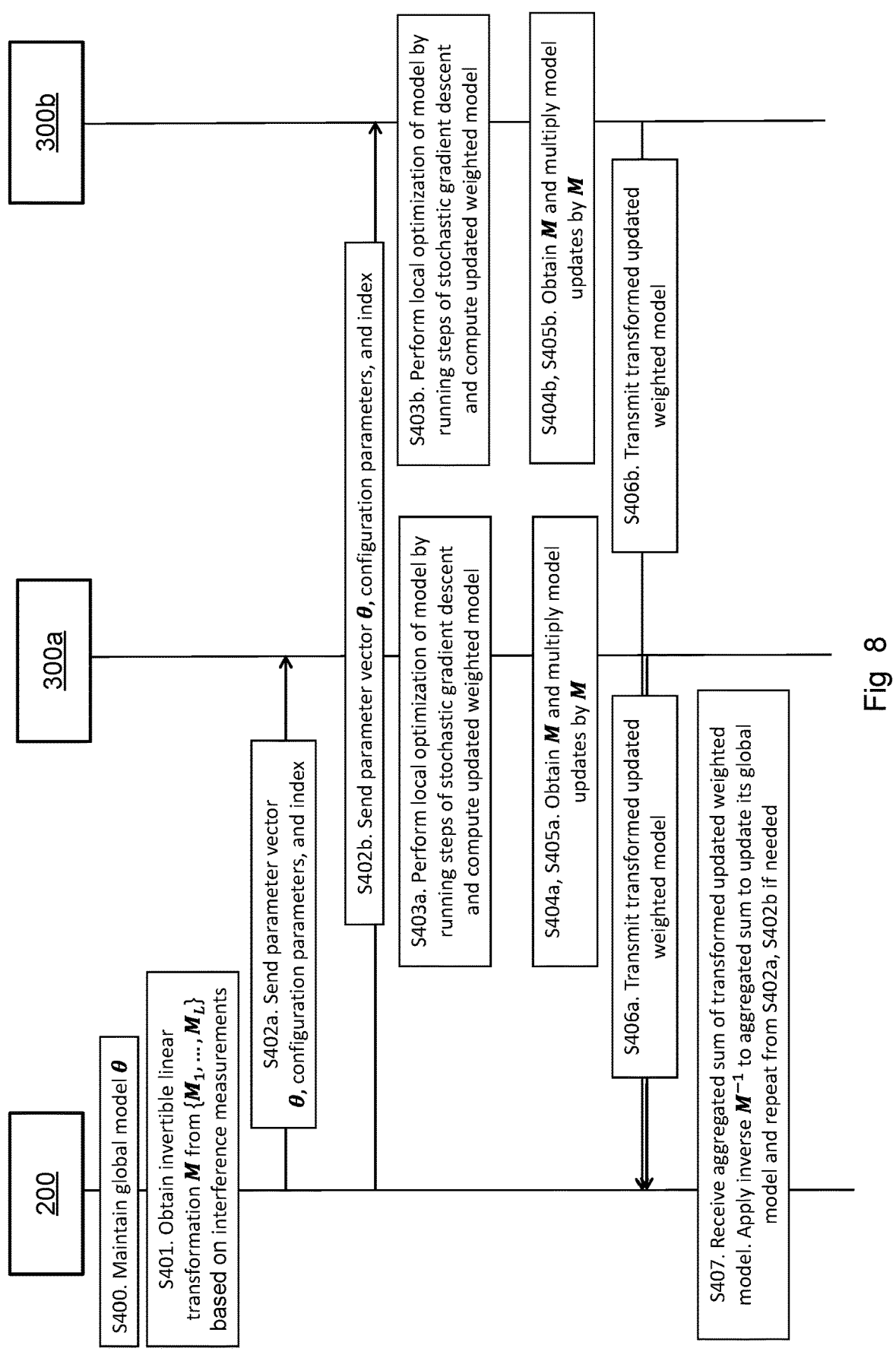

One particular embodiment of performing an iterative learning process with agent entities 300*a*:300K as performed by the server entity 200 and of performing an iterative learning process with a server entity 200 as performed by the agent entity 300*k* based on at least some of the above disclosed embodiments will now be disclosed in detail with reference to the signalling diagram of FIG. 8. For simplicity of exposition, we consider a system with one server entity 200 and two agent entities 300*a*, 300*b* (k=1, 2). The extension to an arbitrary number of agent entities 300*a*:300K should be clear to the skilled person in the art.

S400: The server entity 200 maintains a global model vector θ of dimension N.

S401: The server entity 200 obtains, based on its interference measurements on each RE, an invertible linear transformation (N×N matrix M) from a pre-determined family of L matrices $\{M_1, \ldots, M_L\}$. Let i be the index of the selected matrix (i∈$\{1, \ldots, L\}$), such that $M=M_i$.

As disclosed above, $\{M_1, \ldots, M_L\}$ might be permutation matrices or orthonormal matrices. How to select the matrix M (or equivalently, the index i) has been disclosed above.

S402*a*, S402*b*: The server entity 200 provides configuration in terms of the model θ to the agent entities 300*a*:300K together with the index i of the transformation matrix. The server entity 200 might also provide configuration for computation of the iterative learning process (such as weights, number of steps of a stochastic gradient algorithm, etc.) and transmission parameters (such as time of transmission, phase rotation, power control, etc.).

S403*a*, S403*b*: The agent entities 300*a*:300K obtain their model updates from their local training data. Specifically, the k:th agent entity 300*k* obtains the N-vector $\delta_k$. The k:th agent entity 300*k* might obtain the N-valued vector $\delta_k$ by executing $E_k$ steps of a stochastic gradient algorithm on the local training data and applies a weight to obtain $w_k\delta_k$.

S404*a*, S404*b*: The agent entities 300*a*:300K, having knowledge of the pre-determined family of L matrices $\{M_1, \ldots, M_L\}$, and receiving the index i from the server entity 200, obtain the matrix M that was determined by the server entity 200.

S405a, S405b: The agent entities 300a:300K multiply their model updates by M. Specifically, the k:th agent entity 300k obtains the N-valued vector $M\delta_k$ (or $w_k M\delta_k$ in case weights are used).

S406a, S406b: The agent entities 300a:300K simultaneously transmit their processed model updates. Specifically, the k:th agent entity 300k transmits the N-valued vector $M\delta_k$ (or $w_k M\delta_k$ in case weights are used) over N REs. In this transmission, appropriate phase-rotation and power control is applied at each of the agent entities 300a:300K.

In some examples, the agent entities 300a:300K obtain the channel response from itself to the server entity 200 in each RE (for example, by using pilots and feedback, or by exploiting reciprocity), and pre-compensates the transmitted phase such that if the phase of the channel from the k:th agent entity 300k to the server entity 200 is φ, the k:th agent entity 300k applies the rotation $e^{-j\phi}$.

In some examples, the agent entities 300a:300K apply inverse path-loss power control, such that the computational results from all agent entity entities 300a:300K are received with same received power at the server entity 200.

S407: The server entity 200 receives the computational results from the agent entity entities 300a:300K. Let x be the received vector representing the computational results from all agent entity entities 300a:300K. The server entity 200 first obtains $M^{-1}x$, which equals (neglecting noise and interference in the communication channel) the sought-after aggregated update $\delta_1 + \delta_2 + \ldots + \delta_K$ (or $w_1\delta_1 + w_2\delta_2 + \ldots + w_k\delta_K$ in case weight are used).

The process is repeated from steps S402a, S402b if the termination criterion is not met.

Figure 9:
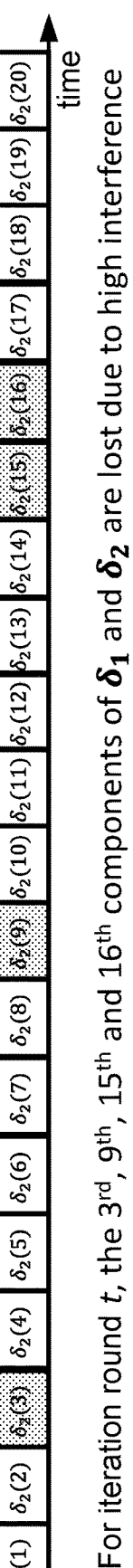
FIG. 9 schematically illustrates averaging effects according to an embodiment.

Reference is next made to FIG. 9 which schematically illustrates averaging effects according to an embodiment. In the example depicted in FIG. 9, the linear mapping M is provided as a permutation P, where for the global iteration round t the identity matrix is applied (i.e., no permutation) and for the global iteration round t+1, a time-reversal permutation is applied (i.e. where the sequence ordering is reversed). The model consists of a vector 900 of length 20. In the illustrative example of FIG. 9 it is assumed that the server entity 200 knows a priori that there is high interference on REs 3, 9, 15 and 16. Consequently, in global iteration round t, the third, ninth, fifteenth and sixteenth components of the model update from all agent entity entities 300a:300K are lost. In the next global iteration round (t+1), although the same REs are affected by strong interference, due to the remapping induced by P, this time instead the fifth, sixth, twelfth and eighteenth components of the model updates are lost. Hence, over time, it is ensured that not the same component of the model is lost every time.

Illustrative examples where the herein disclosed embodiments apply will now be disclosed.

According to a first example, the computational task pertains to prediction of best secondary carrier frequencies to be used by user equipment 170a:170K in which the agent entities 300a:300K are provided. The data locally obtained by the agent entity 300k can then represent a measurement on a serving carrier of the user equipment 170k. In this respect, the best secondary carrier frequencies for user equipment 170a:170K can be predicted based on their measurement reports on the serving carrier. The secondary carrier frequencies as reported thus defines the computational result. In order to enable such a mechanism, the agent entities 300a:300K can be trained by the server entity 200, where each agent entity 300k takes as input the measurement reports on the serving carrier(s) (among possibly other available reports such as timing advance, etc.) and as outputs a prediction of whether the user equipment 170k in which the agent entity 300k is provided has coverage or not in the secondary carrier frequency.

According to a second example, the computational task pertains to compressing channel-state-information using an auto-encoder, where the server entity 200 implements a decoder of the auto-encoder, and where each of the agent entities 300a:300K implements a respective encoder of the auto-encoder. An autoencoder can be regarded as a type of neural network used to learn efficient data representations (denoted by code hereafter). Instead of transmitting raw Channel Impulse Response (CIR) values from the user equipment 170a:170K to the network node 160, the agent entities 300a:300K encodes the raw CIR values using the encoders and report the resulting code to the server entity 200. The code as reported thus defines the computational result. The server entity 200, upon reception of the code from the agent entities 300a:300K, reconstructs the CIR values using the decoder. Since the code can be sent with fewer information bits, this will result in significant signaling overhead reduction. The reconstruction accuracy can be further enhanced if as many independent agent entities 300a:300K as possible are utilized. This can be achieved by enabling each agent entity 300k to contribute to training a global model preserved at the server entity 200.

According to a third example, the computational task pertains to signal quality drop prediction. The signal quality drop prediction is based on measurements on wireless links used by user equipment 170a:170K in which the agent entities 300a:300K are provided. In this respect, based on received data, in terms of computational results, in the reports, the server entity 200 can learn, for example, what sequence of signal quality measurements (e.g. reference signal received power; RSRP) that results in a large signal quality drop. After a model is trained, for instance using the iterative learning process, the server entity 200 can provide the model to the agent entities 300a:300K. The model can be provided either to agent entities 300a:300K having taken part in the training, or to other agent entities 300a:300K. The agent entities 300a:300K can then apply the model to predict future signal quality values. This signal quality prediction can then be used in the context of any of: initiating inter-frequency handover, setting handover and/or reselection parameters, changing device scheduler priority so as to schedule the user equipment 170a:170K when the expected signal quality is good. The data for training such a model is located at the device-side where the agent entities 300a:300K reside, and hence an iterative learning process as disclosed herein can be used to efficiently learn the future signal quality prediction.

Figure 10:
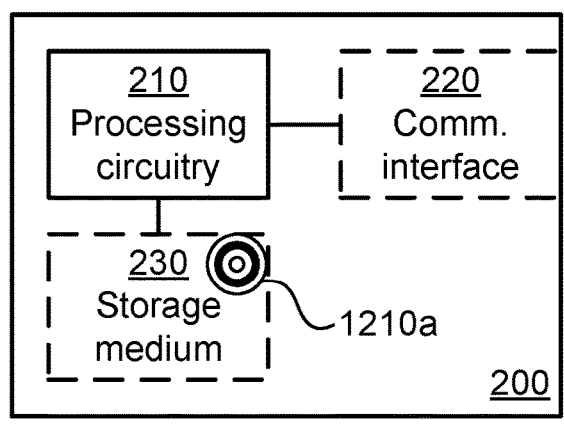
FIG. 10 is a schematic diagram showing functional units of a server entity according to an embodiment.

FIG. 10 schematically illustrates, in terms of a number of functional units, the components of a server entity 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1410a (as in FIG. 14), e.g. in the form of a storage medium 230. The processing circuitry 210 may further be provided as at least one application specific integrated circuit (ASIC), or field programmable gate array (FPGA).

Particularly, the processing circuitry 210 is configured to cause the server entity 200 to perform a set of operations, or steps, as disclosed above. For example, the storage medium 230 may store the set of operations, and the processing circuitry 210 may be configured to retrieve the set of operations from the storage medium 230 to cause the server entity 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The server entity 200 may further comprise a communications interface 220 for communications with other entities, functions, nodes, and devices, either directly or indirectly. As such the communications interface 220 may comprise one or more transmitters and receivers, comprising analogue and digital components.

The processing circuitry 210 controls the general operation of the server entity 200 e.g. by sending data and control signals to the communications interface 220 and the storage medium 230, by receiving data and reports from the communications interface 220, and by retrieving data and instructions from the storage medium 230. Other components, as well as the related functionality, of the server entity 200 are omitted in order not to obscure the concepts presented herein.

Figure 11:
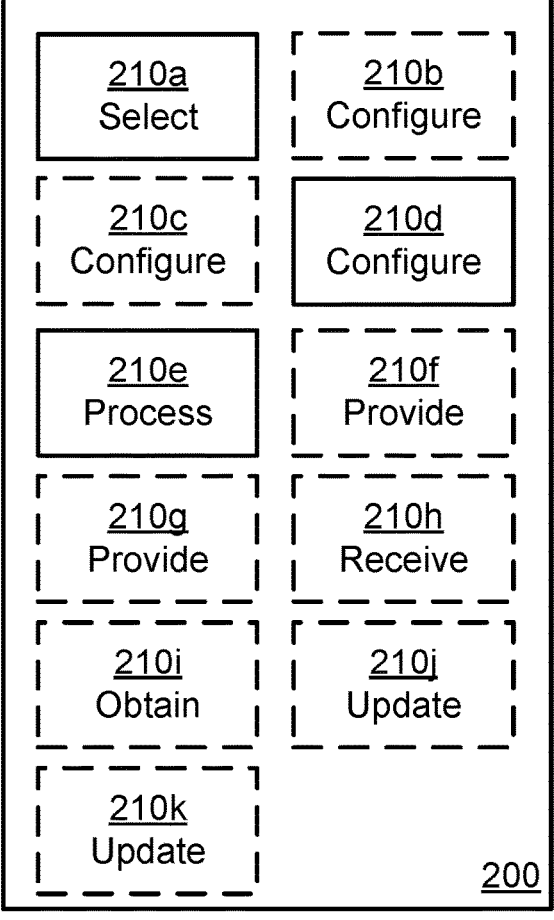
FIG. 11 is a schematic diagram showing functional modules of a server entity according to an embodiment.

FIG. 11 schematically illustrates, in terms of a number of functional modules, the components of a server entity 200 according to an embodiment. The server entity 200 of FIG. 11 comprises a number of functional modules; an associate module 210a configured to perform step S102, a configure module 210d configured to perform step S108, and a process module 210e configured to perform step S110. The server entity 200 of FIG. 11 may further comprise a number of optional functional modules, such as any of a configure module 210b configured to perform step S104, a configure module 210c configured to perform step S106, a provide module 210f configured to perform step S110a, a provide module 210g configured to perform step S110b, a receive module 210h configured to perform step S110c, an obtain module 210i configured to perform step S110d, an update module 210j configured to perform step S110e, and an update module 210k configured to perform step S110f.

In general terms, each functional module 210a:210k may be implemented in hardware or in software. Preferably, one or more or all functional modules 210a:210k may be implemented by the processing circuitry 210, possibly in cooperation with the communications interface 220 and/or the storage medium 230. The processing circuitry 210 may thus be arranged to from the storage medium 230 fetch instructions as provided by a functional module 210a:210k and to execute these instructions, thereby performing any steps of the server entity 200 as disclosed herein.

The server entity 200 may be provided as a standalone device or as a part of at least one further device. For example, the server entity 200 may be provided in a node of the radio access network or in a node of the core network. Alternatively, functionality of the server entity 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time. Thus, a first portion of the instructions performed by the server entity 200 may be executed in a first device, and a second portion of the instructions performed by the server entity 200 may be executed in a second device; the herein disclosed embodiments are not limited to any particular number of devices on which the instructions performed by the server entity 200 may be executed. Hence, the methods according to the herein disclosed embodiments are suitable to be performed by a server entity 200 residing in a cloud computational environment. Therefore, although a single processing circuitry 210 is illustrated in FIG. 10 the processing circuitry 210 may be distributed among a plurality of devices, or nodes. The same applies to the functional modules 210a:210k of FIG. 11 and the computer program 1420a of FIG. 14.

Figure 12:
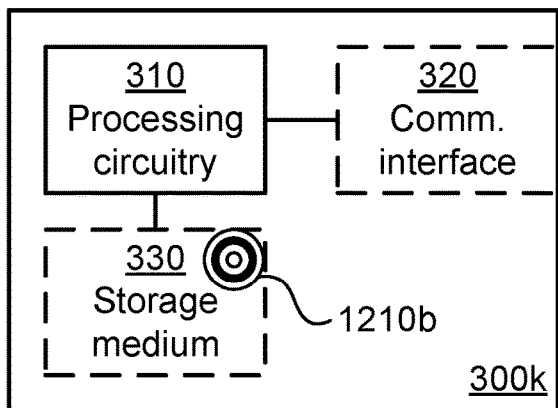
FIG. 12 is a schematic diagram showing functional units of an agent entity according to an embodiment.

FIG. 12 schematically illustrates, in terms of a number of functional units, the components of an agent entity 300k according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1410b (as in FIG. 14), e.g. in the form of a storage medium 330. The processing circuitry 310 may further be provided as at least one application specific integrated circuit (ASIC), or field programmable gate array (FPGA).

Particularly, the processing circuitry 310 is configured to cause the agent entity 300k to perform a set of operations, or steps, as disclosed above. For example, the storage medium 330 may store the set of operations, and the processing circuitry 310 may be configured to retrieve the set of operations from the storage medium 330 to cause the agent entity 300k to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The agent entity 300k may further comprise a communications interface 320 for communications with other entities, functions, nodes, and devices, either directly or indirectly. As such the communications interface 320 may comprise one or more transmitters and receivers, comprising analogue and digital components.

The processing circuitry 310 controls the general operation of the agent entity 300k e.g. by sending data and control signals to the communications interface 320 and the storage medium 330, by receiving data and reports from the communications interface 320, and by retrieving data and instructions from the storage medium 330. Other components, as well as the related functionality, of the agent entity 300k are omitted in order not to obscure the concepts presented herein.

Figure 13:
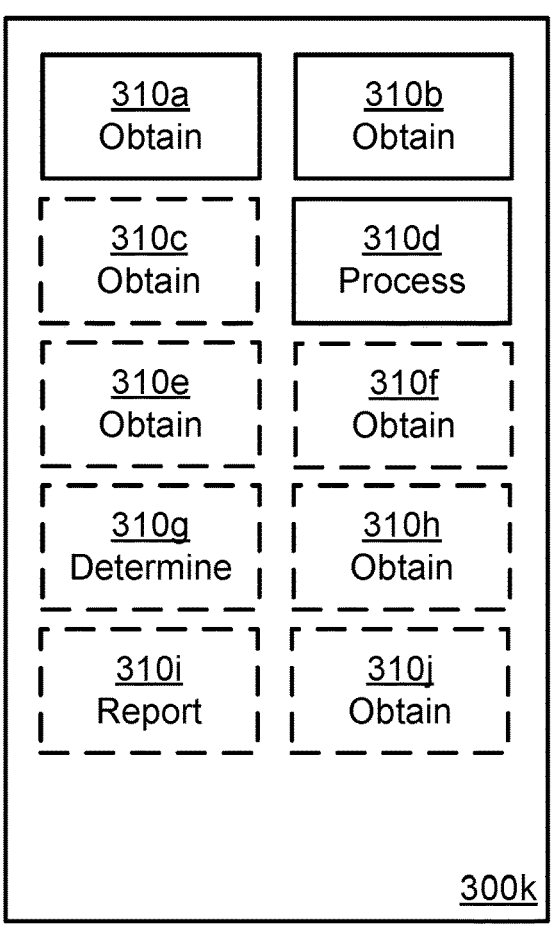
FIG. 13 is a schematic diagram showing functional modules of an agent entity according to an embodiment.

FIG. 13 schematically illustrates, in terms of a number of functional modules, the components of an agent entity 300k according to an embodiment. The agent entity 300k of FIG. 13 comprises a number of functional modules; an obtain module 310a configured to perform step S202, an obtain module 310b configured to perform step S204, and a process module 310d configured to perform step S208. The agent entity 300k of FIG. 13 may further comprise a number of optional functional modules, such as any of an obtain module 310c configured to perform step S206, an obtain module 310e configured to perform step S208a, an obtain module 310f configured to perform step S208b, a determine module 310g configured to perform step S208c, an obtain module 310h configured to perform step S208d, a report module 310*i* configured to perform step S208*e*, an obtain 310*j* module configured to perform step S208*f*.

In general terms, each functional module 310*a*:310*j* may be implemented in hardware or in software. Preferably, one or more or all functional modules 310*a*:310*j* may be implemented by the processing circuitry 310, possibly in cooperation with the communications interface 320 and/or the storage medium 330. The processing circuitry 310 may thus be arranged to from the storage medium 330 fetch instructions as provided by a functional module 310*a*:310*j* and to execute these instructions, thereby performing any steps of the agent entity 300*k* as disclosed herein.

Figure 14:
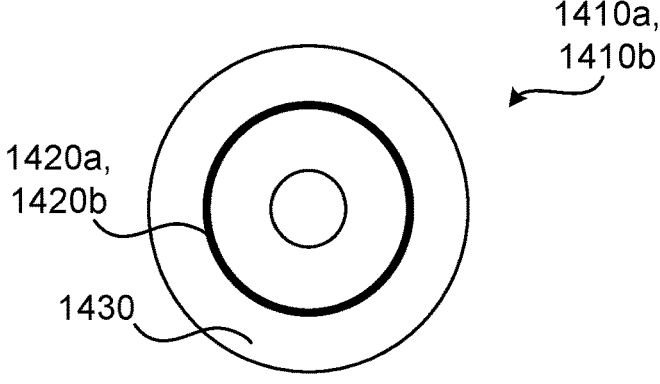
FIG. 14 shows one example of a computer program product comprising computer readable means according to an embodiment.

FIG. 14 shows one example of a computer program product 1410*a*, 1410*b* comprising computer readable means 1430. On this computer readable means 1430, a computer program 1420*a* can be stored, which computer program 1420*a* can cause the processing circuitry 210 and thereto operatively coupled entities and devices, such as the communications interface 220 and the storage medium 230, to execute methods according to embodiments described herein. The computer program 1420*a* and/or computer program product 1410*a* may thus provide means for performing any steps of the server entity 200 as herein disclosed. On this computer readable means 1430, a computer program 1420*b* can be stored, which computer program 1420*b* can cause the processing circuitry 310 and thereto operatively coupled entities and devices, such as the communications interface 320 and the storage medium 330, to execute methods according to embodiments described herein. The computer program 1420*b* and/or computer program product 1410*b* may thus provide means for performing any steps of the agent entity 300*k* as herein disclosed.

In the example of FIG. 14, the computer program product 1410*a*, 1410*b* is illustrated as an optical disc, such as a CD (compact disc) or a DVD (digital versatile disc) or a Blu-Ray disc. The computer program product 1410*a*, 1410*b* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1420*a*, 1420*b* is here schematically shown as a track on the depicted optical disk, the computer program 1420*a*, 1420*b* can be stored in any way which is suitable for the computer program product 1410*a*, 1410*b*.

Figure 15:
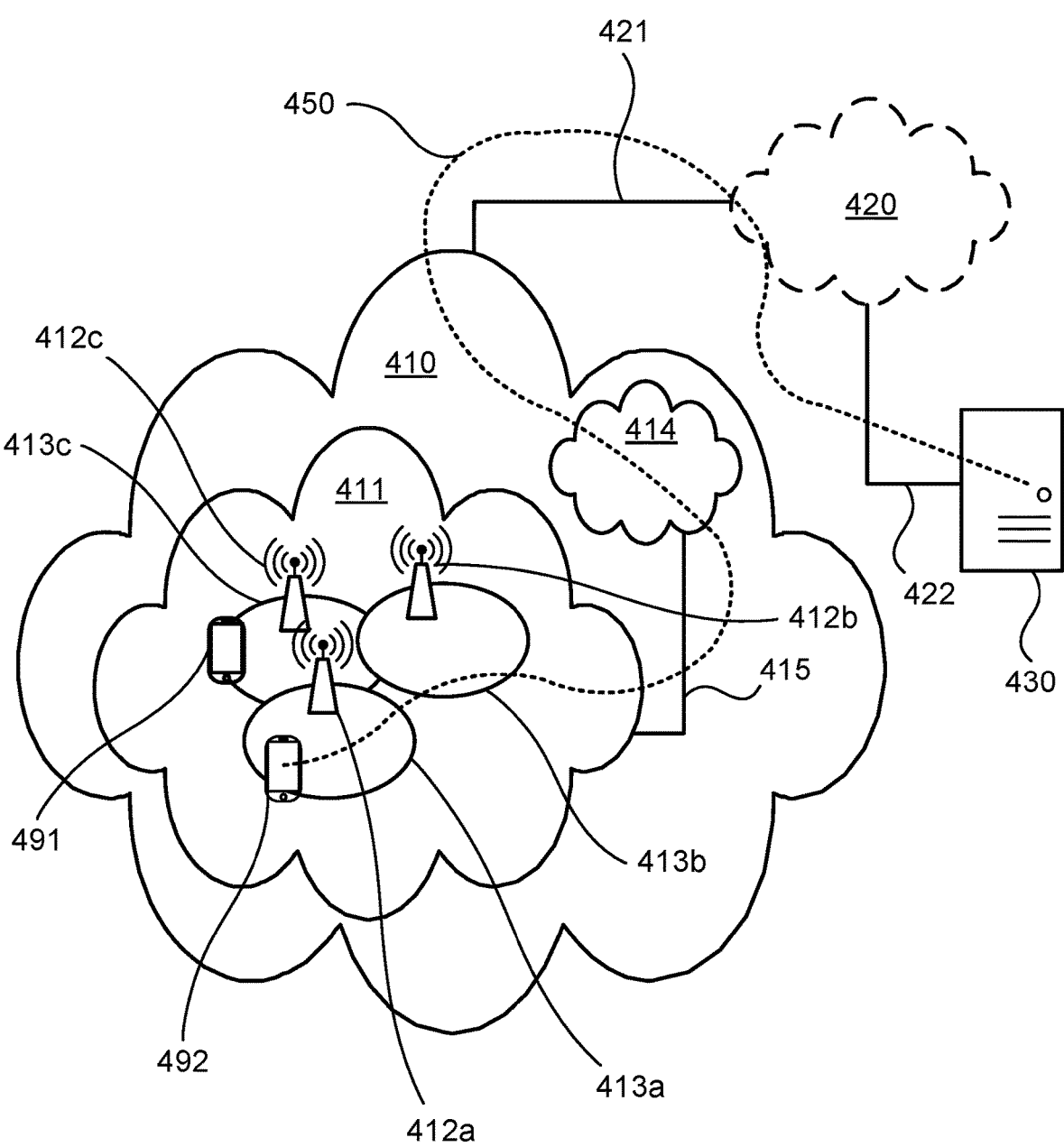
FIG. 15 is a schematic diagram illustrating a telecommunication network connected via an intermediate network to a host computer in accordance with some embodiments.

FIG. 15 is a schematic diagram illustrating a telecommunication network connected via an intermediate network 420 to a host computer 430 in accordance with some embodiments. In accordance with an embodiment, a communication system includes telecommunication network 410, such as a 3GPP-type cellular network, which comprises access network 411, such as access network 110 in FIG. 1, and core network 414, such as core network 120 in FIG. 1. Access network 411 comprises a plurality of radio access network nodes 412*a*, 412*b*, 412*c*, such as NBs, eNBs, gNBs (each corresponding to the network node 160 of FIG. 1) or other types of wireless access points, each defining a corresponding coverage area, or cell, 413*a*, 413*b*, 413*c*. Each radio access network nodes 412*a*, 412*b*, 412*c* is connectable to core network 414 over a wired or wireless connection 415. A first UE 491 located in coverage area 413*c* is configured to wirelessly connect to, or be paged by, the corresponding network node 412*c*. A second UE 492 in coverage area 413*a* is wirelessly connectable to the corresponding network node 412*a*. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to UEs 170*a*:17*o*K of FIG. 1.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 15 as a whole enables connectivity between the connected UEs 491, 492 and host computer 430. The connectivity may be described as an over-the-top (OTT) connection 450. Host computer 430 and the connected UEs 491, 492 are configured to communicate data and/or signalling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 16:
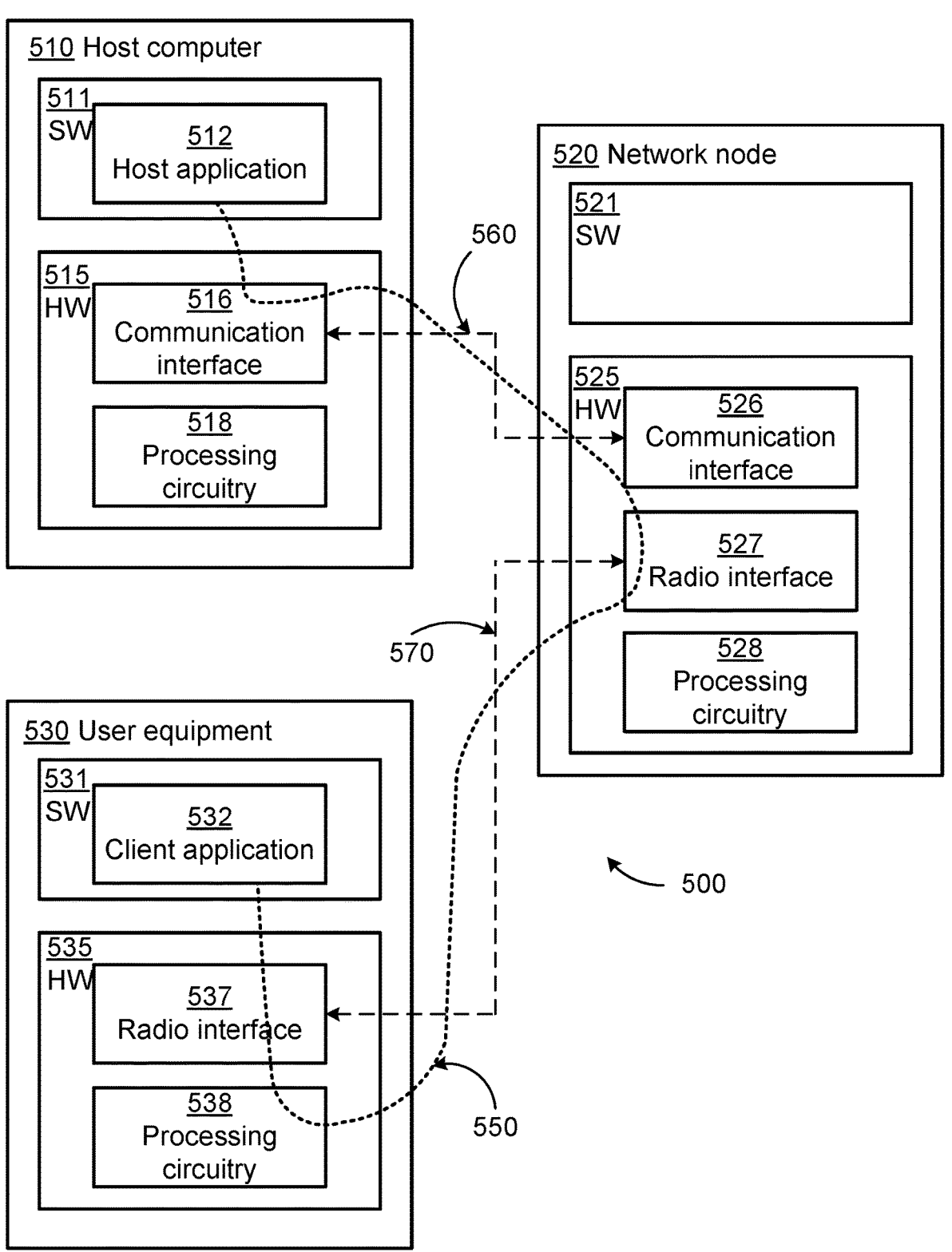
FIG. 16 is a schematic diagram illustrating host computer communicating via a radio base station with a terminal device over a partially wireless connection in accordance with some embodiments.

FIG. 16 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 16. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the UEs 170*a*:17*o*K of FIG. 1. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 corresponds to the network node 160 of FIG. 1. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 16) served by radio access network node 520. Communication interface 526 may be configured to facilitate connection 560 to host computer 510. Connection 560 may be direct or it may pass through a core network (not shown in FIG. 16) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 16 may be similar or identical to host computer 430, one of network nodes 412a, 412b, 412c and one of UEs 491, 492 of FIG. 15, respectively. This is to say, the inner workings of these entities may be as shown in FIG. 16 and independently, the surrounding network topology may be that of FIG. 15.

In FIG. 16, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signalling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for performing a federated learning process with agent entities integrated within a user equipment (UE) for signal quality drop prediction within a communication network, the method being performed by a server entity, the method comprising:

selecting a linear mapping M to be used by the agent entities when reporting computational results of a computational task to the server entity, wherein the linear mapping M has an inverse $M^{-1}$, wherein the linear mapping M is a function of the estimated interference level per resource element, and wherein the linear mapping M is selected as a function of an estimated interference level for a radio propagation channel over which the agent entities report the computational results of the computational task to the server entity;

configuring the agent entities with the computational task; and performing the federated learning process with the agent entities until a termination criterion is met, wherein the computational results are phase-rotated and transmitted using linear analog modulation to achieve aggregation of the computational results over-the-air, wherein the server entity as part of performing the federated learning process applies the inverse $M^{-1}$ of the linear mapping M to a sum of the aggregated computational results received over-the-air from the agent entities, wherein the aggregated computational results requires lesser resource elements for transmission.

2. The method according to claim 1, wherein the computational results per iteration are sent in frames composed of resource elements, wherein the interference level is estimated per each resource element in the frame, and wherein the resource elements are time/frequency samples or define a spatial mode.

3. The method according to claim 1, wherein the linear mapping M defines in which of the resource elements in the frame the agent entities are to send the computational results and as well as in which of the resource elements in the frame the agent entities are not to send the computational results.

4. The method according to claim 1, wherein the interference level is estimated during a period free from scheduled transmissions from the agent entities.

5. The method according to claim 1, wherein the interference level is estimated based on the computational results received from the agent entities.

6. The method according to claim 1, wherein the method further comprises:

configuring the agent entities with the linear mapping M over a channel established between the server entity and the agent entities.

7. The method according to claim 1, wherein the linear mapping M is represented by a matrix $M_k$ having an inverse $M_k^{-}1$, and wherein the computational results received from the agent entities are multiplied with the inverse $M_k^{-1}$ of the matrix $M_k$ when the inverse $M^{-1}$ of the linear mapping M is applied to the computational results.

8. The method according to claim 7, wherein the matrix $M_k$ is a permutation matrix or an orthonormal matrix.

9. The method according to claim 1, wherein the method further comprises:

configuring the agent entities to repetitively send the computational results in at least two repetitions, where mutually different linear mapping M are to be applied to the computational results for each of the at least two repetitions.

10. The method according to claim 1, wherein the linear mapping M is the same for all the agent entities.

11. The method according to claim 1, wherein performing on iteration of the federated learning process comprises:

providing a parameter vector of the computational task to the agent entities;

receiving the computational results as a function of the parameter vector from the agent entities;

obtaining inverse transformed computational results by applying the inverse $M^{-1}$ to the sum of the aggregated computational results; and updating the parameter vector as a function of an aggregate of the inverse transformed computational results.

12. The method according to claim 1, wherein the method further comprises:

updating the linear mapping M for a next iteration of the federated learning process, whereby the linear mapping M as updated has a new inverse.

13. The method according to claim 1, wherein the method further comprises:

providing an indication to the agent entities as to whether or not to apply the linear mapping M when reporting the computational results of the computational task to the server entity, wherein whether or not the agent entities apply the linear mapping M is determined based on performance feedback obtained from the agent entities.

14. A method for performing a federated learning process with a server entity, the method being performed by an agent entity integrated within a user equipment (UE) for signal quality drop prediction within a communication network, the method comprising:

obtaining a linear mapping M to be used by the agent entity when reporting computational results of a computational task to the server entity;

obtaining configuration in terms of the computational task from the server entity; and performing the federated learning process with the server entity until a termination criterion is met, wherein the computational results are phase-rotated and transmitted using linear analog modulation to achieve aggregation of the computational results over-the-air requiring lesser resource elements, wherein the agent entity as part of performing the federated learning process applies the linear mapping M to the computational results before sending the computational results to the server entity.

15. The method according to claim 14, wherein the computational results per iteration are sent in frames composed of resource elements, and wherein the linear mapping M defines in which of the resource elements in the frame the agent entity is to send the computational results and as well as in which of the resource elements in the frame the agent entity is not to send the computational results.

16. A server entity for performing a federated learning process with agent entities integrated within a user equipment (UE) for signal quality drop prediction within a communication network, the server entity comprising processing circuitry, the processing circuitry being configured to cause the server entity to:

select a linear mapping M to be used by the agent entities when reporting computational results of a computational task to the server entity, wherein the linear mapping M has an inverse $M^{-1}$, and wherein the linear mapping M is selected as a function of an estimated interference level for a radio propagation channel over which the agent entities report the computational results of the computational task to the server entity;

configure the agent entities with the computational task; and perform the federated learning process with the agent entities until a termination criterion is met, wherein the computational results are phase-rotated and transmitted using linear analog modulation to achieve aggregation of the computational results over-the-air, wherein the server entity as part of performing the federated learning process applies the inverse $M^{-1}$ of the linear mapping M to a sum of the aggregated computational results received over-the-air from the agent entities, wherein the aggregated computational results requires lesser resource elements for transmission.

\* \* \* \* \*